(12) United States Patent
Brakes (10) Patent No.: US 11,242,133 B2
(45) Date of Patent: Feb. 8, 2022

(54) AIRCRAFT CONTROL MECHANISM

(71) Applicant: Airbus Operations Limited, Bristol (GB)

(72) Inventor: David Brakes, Bristol (GB)

(73) Assignee: Airbus Operations Limited, Bristol (GB)

( * ) Notice: Subject to any disclaimer, the term of this patent is extended or adjusted under 35 U.S.C. 154(b) by 132 days.

(21) Appl. No.: 16/692,436

(22) Filed: Nov. 22, 2019

(65) Prior Publication Data

US 2020/0164964 A1 May 28, 2020

(30) Foreign Application Priority Data

Nov. 26, 2018 (GB) ..................................... 1819177

(51) Int. Cl.
| | | |
|---|---|---|
| *B64C 13/28* | (2006.01) | |
| *B64C 13/16* | (2006.01) | |
| *B64C 9/02* | (2006.01) | |
| *B64C 9/26* | (2006.01) | |

(52) U.S. Cl.
CPC ................ *B64C 13/16* (2013.01); *B64C 9/02* (2013.01); *B64C 9/26* (2013.01); *B64C 13/28* (2013.01)

(58) Field of Classification Search
CPC ........... B64C 13/16; B64C 13/28; B64C 9/02; B64C 9/18; B64C 9/20; B64C 9/24; B64C 9/26

See application file for complete search history.

(56) References Cited

U.S. PATENT DOCUMENTS

| | | | |
|---|---|---|---|
| 2,742,245 A | 4/1956 | Harpoothian et al. | |
| 2,745,613 A | 5/1956 | Harpoothian et al. | |
| 3,790,106 A * | 2/1974 | Sweeney ................. | B64C 17/00 244/203 |
| 4,753,402 A * | 6/1988 | Cole ........................ | B64C 9/22 244/210 |

(Continued)

FOREIGN PATENT DOCUMENTS

| | | |
|---|---|---|
| EP | 0 230 681 A2 | 8/1987 |
| WO | 2009/056873 | 5/2009 |

(Continued)

OTHER PUBLICATIONS

Combined Search and Examination Report for GB Application No. 1819177.5 dated May 20, 2019, 6 pages.

(Continued)

*Primary Examiner* — Philip J Bonzell
*Assistant Examiner* — Tye William Abell
(74) *Attorney, Agent, or Firm* — Nixon & Vanderhye P.C.

(57) ABSTRACT

A control mechanism includes an existing aerodynamic device, such as a slat 5, that moves between at least one deployed position and a retracted position; and a load-alleviation mechanism 10 arranged to move the aerodynamic device into a load-alleviation position in response to a load 18, such as a gust of wind acting over a predetermined threshold. During flight, an aircraft can experience gusts of wind that cause strain on the wings 4. The addition of a load-alleviation mechanism to a pre-existing aircraft component allows for gust loading to be alleviated without adding significantly to the weight or complexity of the aircraft. The control mechanism may be retro-fitted to existing aircraft.

19 Claims, 5 Drawing Sheets

(56) References Cited

U.S. PATENT DOCUMENTS

| | | | | |
|---|---|---|---|---|
| 4,880,189 A * | 11/1989 | Day | ............... | B64C 9/22 |
| | | | | 244/214 |
| 8,025,257 B2 * | 9/2011 | Gyuricsko | ............... | B64C 9/22 |
| | | | | 244/214 |
| 8,181,913 B2 * | 5/2012 | Jaggard | ............... | B64C 9/24 |
| | | | | 244/214 |
| 9,296,473 B2 * | 3/2016 | Parker | ............... | B64C 9/14 |
| 2010/0187368 A1 * | 7/2010 | Cathelain | ............... | B64C 9/24 |
| | | | | 244/214 |
| 2011/0036944 A1 * | 2/2011 | Mann | ............... | B64C 9/22 |
| | | | | 244/99.3 |
| 2015/0083867 A1 * | 3/2015 | Moser | ............... | B64C 9/24 |
| | | | | 244/214 |
| 2019/0002083 A1 * | 1/2019 | Wilson | ............... | B64C 3/546 |

FOREIGN PATENT DOCUMENTS

| WO | 2009/118547 | 10/2009 |
|---|---|---|
| WO | 2017/118832 | 7/2017 |

OTHER PUBLICATIONS

European Search Report cited in EP 19209907.5, dated Mar. 30, 2020, 8 pages.

* cited by examiner

AIRCRAFT CONTROL MECHANISM

RELATED APPLICATION

This application claim priority to United Kingdome Patent Application GB 1819177.5, filed Nov. 26, 2018, the entirety of which is incorporated by reference.

FIELD OF TECHNOLOGY

This invention relates to a control mechanism for alleviating a gust load on a wing of an aircraft.

BACKGROUND

Wing loading is a term used in aircraft aerodynamics to describe the amount of weight per unit area loaded on an aircraft wing. Basic wing loading is based on the weight of an aircraft and the size of its wings. In flight, the amount of loading experienced by the wing is a sum of the amount of lift generated by the aircraft (based on the speed of the aircraft) and various environmental factors. One particular environmental factor of concern is gust loading, caused by gusts of wind which push upwards on the undersides of the wings. Gust loading can cause unwanted movement in the aircraft, as well as cause the wings of the aircraft to bend or twist.

It has been proposed to counter the effects of gust loading by providing an aircraft with stiffer wings to accommodate the increased bending moment. However, this solution increases the overall flying weight of the aircraft, which in turn reduces the fuel efficiency and range of the aircraft.

BRIEF SUMMARY OF THE TECHNOLOGY

The invention provides an aircraft control mechanism comprising an aerodynamic device and a deployment mechanism selectively operable to move the aerodynamic device between at least one deployed position and a retracted position and further comprising a load-alleviation mechanism arranged to move the aerodynamic device into a load-alleviation position in response to a load acting on the aerodynamic device over a predetermined threshold.

This invention provides a solution to the problem of gust-loading by using an existing component of the aircraft—namely an aerodynamic device such as a slat or flap, and providing it with a mechanism that allows it automatically to assume a position in response to gusts of wind, which position alleviates the effect of the consequent loads on the wing. For example, in use, in the load-alleviation position the aerodynamic device may be arranged so that a portion of it protrudes so as to spoil the flow of air over the wing. The addition of such a mechanism to a pre-existing arrangement of components on an aircraft allows for gust loading to be alleviated without adding significantly to the weight or complexity of the aircraft. Furthermore, the invention may be retro-fitted to existing aircraft.

Advantageously, the control mechanism is arranged so that the aerodynamic device is capable of moving into the load-alleviation position only when the aerodynamic device is in the retracted position. This feature ensures that the load alleviation function is active only during the cruise phase of a flight.

Preferably, the control mechanism further comprises a spring arranged to apply a restoring force when the aerodynamic device is in the load-alleviation position. This ensures that the aerodynamic device moves out of the load-alleviation position when the load acting on the aerodynamic device falls below the predetermined threshold.

Preferably, the load-alleviation mechanism includes a bistable mechanism. This ensures that the load-alleviation mechanism is able to snap from its initial position to the load-alleviation position. The bistable mechanism may be a simple ball detent device.

Preferably, the load-alleviation mechanism is also the means by which the aerodynamic device is connected to its deployment mechanism.

The deployment mechanism may include at least one track and an actuator arranged to move the aerodynamic device selectively along the track or tracks between the deployed positions and the retracted position.

The invention further provides an aircraft wing including the aircraft control mechanism. Preferably, the load-alleviation mechanism is arranged so that, when it occupies the load-alleviation position, it spoils the flow of air over the wing and hence reduces the lift forces experienced by the wing.

The aerodynamic device may be a slat on the leading edge of the wing. Alternatively, the aerodynamic device may be a flap on the trailing edge of the wing.

A plurality of aircraft control mechanisms constructed according to the invention may be provided on the wing. These may be: some or all of the slats on the leading edge; some or all of the flaps on the trailing edge; or a combination of both.

The aerodynamic devices may be "tuned", so that each device moves into the load alleviation position at a particular load threshold. Thus, each aerodynamic device may be arranged to activate in dependence on its position on the wing.

Actuators may be provided to selectively move the, or each, control mechanism into and out of the load-alleviation position.

The invention further provides an aircraft including wings fitted with the control mechanism constructed according to the invention. The aircraft may be fitted with gust sensors arranged to energise the actuators and move the, or each, aerodynamic device into the load-alleviation position when an imminent forceful gust of wind is detected.

BRIEF DESCRIPTION OF THE DRAWINGS

The invention will now be described, by way of example, with reference to the accompanying drawings in which.

DETAILED DESCRIPTION OF EMBODIMENTS OF THE TECHNOLOGY

Figure 1:
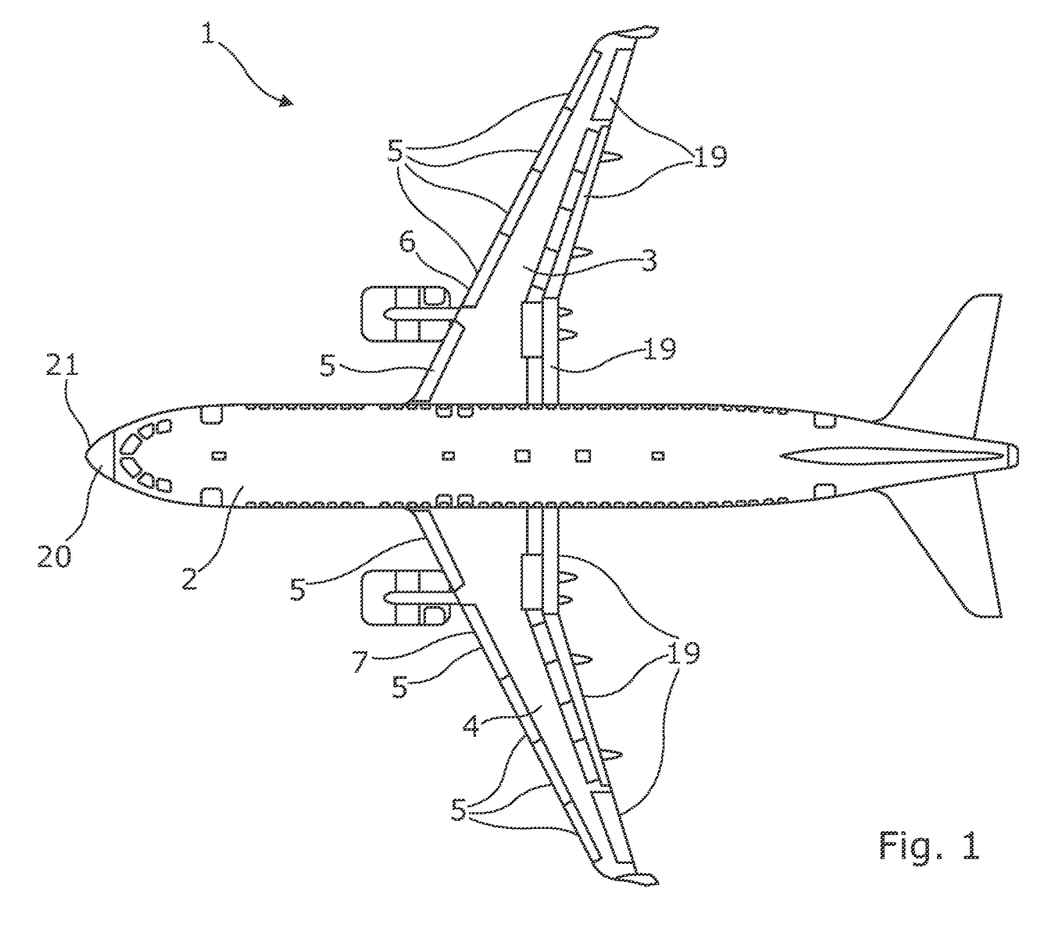
FIG. 1 is a plan view of an aircraft incorporating a control mechanism constructed according to the invention.

With reference to FIG. 1, an aircraft generally indicated by the reference numeral 1 is shown. The aircraft 1 comprises a fuselage 2 for holding passengers and cargo, a right (starboard) wing 3 and a left (port) wing 4. The wings 3, 4 each have a plurality of aerodynamic devices in the form of slats 5 mounted along their respective leading edges 6, 7. A slat is an aerodynamic device typically employed during take-off and landing of the aircraft. When in the stowed or retracted position as shown in FIG. 1, the slats 5 are positioned adjacent to the wing leading edges 6, 7 and in line with the wings 3, 4. When deployed, the slats 5 translate forwards away from the leading edges 6, 7 of the wings 3, 4 and rotate downwards away from the wings. The slats 5 effectively increase the surface area and camber of each wing 3, 4 and provide additional lift to the wings. The arrangement of one slat and its respective leading edge is shown in more detail in FIGS. 2 and 3.

Figure 2A:
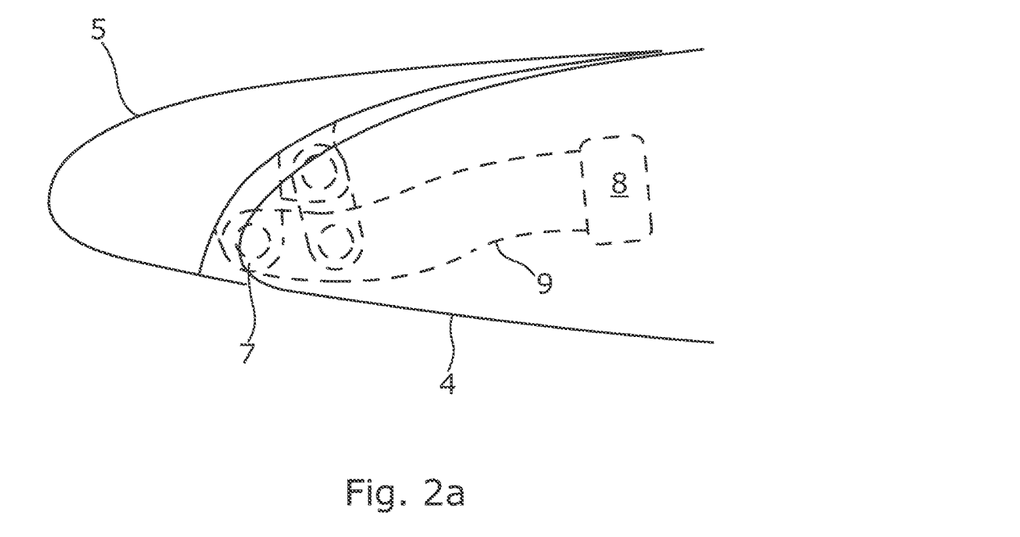
FIG. 2a is a side sectional view of part of a wing of FIG. 1 showing an aerodynamic device in a first position.

With reference to FIG. 2a, the slat 5 is shown in the stowed or retracted position against the leading edge 7 of the port wing 4. This is the position that the slat normally occupies during cruise flight of the aircraft 1. During take-off and landing or during other slow speed maneuvers, the lift coefficient of the aircraft is reduced. In order to prevent the aircraft from stalling, a deployment mechanism 8 pushes the slats 5 into the extended position shown in FIG. 2b.

Figure 2B:
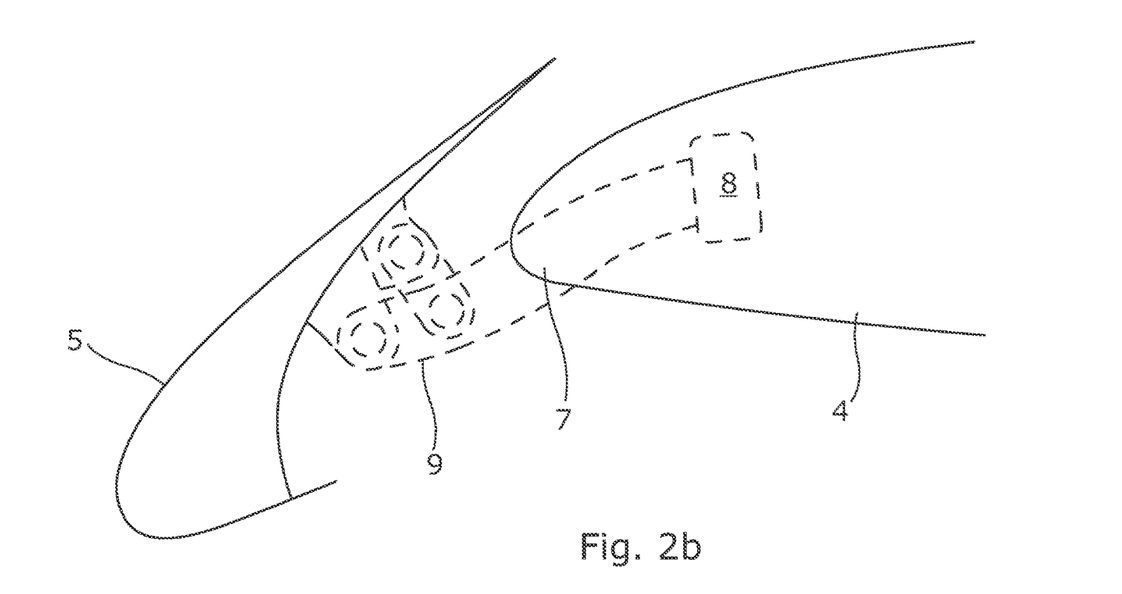
FIG. 2b shows the aerodynamic device of FIG. 2a in a second position.

The deployment mechanism 8 comprises a plurality of tracks, one of which 9 is shown by way of example. An actuator assembly (not shown) is arranged to move each track 9 into the extended position by means of, for example, a rack and pinion mechanism (also not shown). In this extended position, the slat 5 is pushed forwardly of the leading edge 7 of the wing 4. The shape of the tracks 9 defines the position of the slat 5 relative to the leading edge 7 as it is deployed; the tracks may be a number of different shapes but are typically arcuate to define an arced forward and downward movement as the slat is deployed.

The deployed slat 5 increases both the surface area of the wing and also its camber or curvature. This has the effect of raising the lift coefficient generated by the wing, which allows the aircraft to produce the required lift at lower speeds. Thus, the stalling speed of the aircraft is reduced and the aircraft can safely maintain flight at lower speeds. The deployment of the slats 5 also increases the wing drag, which can be beneficial during approach and landing because it slows the aircraft.

Previously, slats were deployed and retracted automatically by the action of airflow on the slat itself. As the aircraft slowed down to land, the aerodynamic force on the slats was reduced and springs pushed the slats into the deployed position of FIG. 2b. Slats are now more reliably extended and retracted using hydraulically or electrically powered actuators, under the control of the pilot. Such actuators can be configured to enable the slats 5 to occupy a plurality of deployed positions up to full extension in dependence on flying conditions. The exact mechanism 8 by which the slats 5 are deployed and retracted does not form the basis of this patent application: any suitable mechanism may be utilised.

Figure 2C:
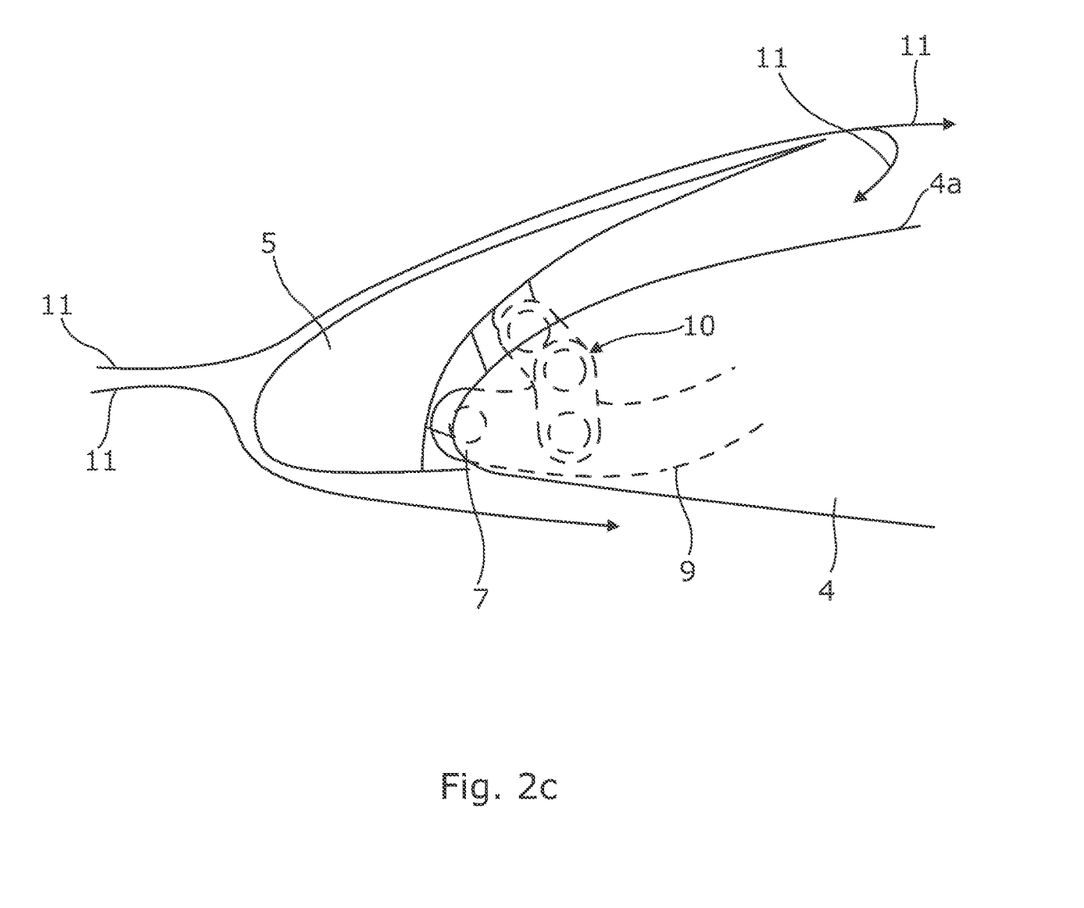
FIG. 2c shows the aerodynamic device of FIG. 2a in a third position.

During the course of normal cruising flight of the aircraft 1, the slats 5 are usually in the retracted position of FIG. 2a. During this phase of flight, the aircraft 1 typically encounters upward or downward moving pockets of air, more commonly referred to as turbulence. These sudden wind gusts induce very rapid changes in the wing angle of attack, which translates into sudden increases in the wing lift. The increase in wing lift corresponds to a sudden escalation in the bending moment on the wing structure. In accordance with the invention, a load-alleviation mechanism 10 is provided on the slat 5 and acts to urge the slat into a load-alleviation position as is shown in FIG. 2c.

In the load-alleviation position, the slat 5 is tilted with respect to its usual retracted position such that the front of the slat 5 droops downwardly and the edge of the slat adjacent the leading edge 7 is deflected upwardly so that it is spaced from the main body of the wing 4. The rear portion of the slat 5 protrudes with respect to the topmost aerodynamic surface 4a of the wing and spoils airflow over it, significantly reducing lift during the gust event, and thereby alleviating the strain experienced by the wing. Flow lines 11 show the flow of air over and around the slat 5 and wing 4.

Figure 3A:
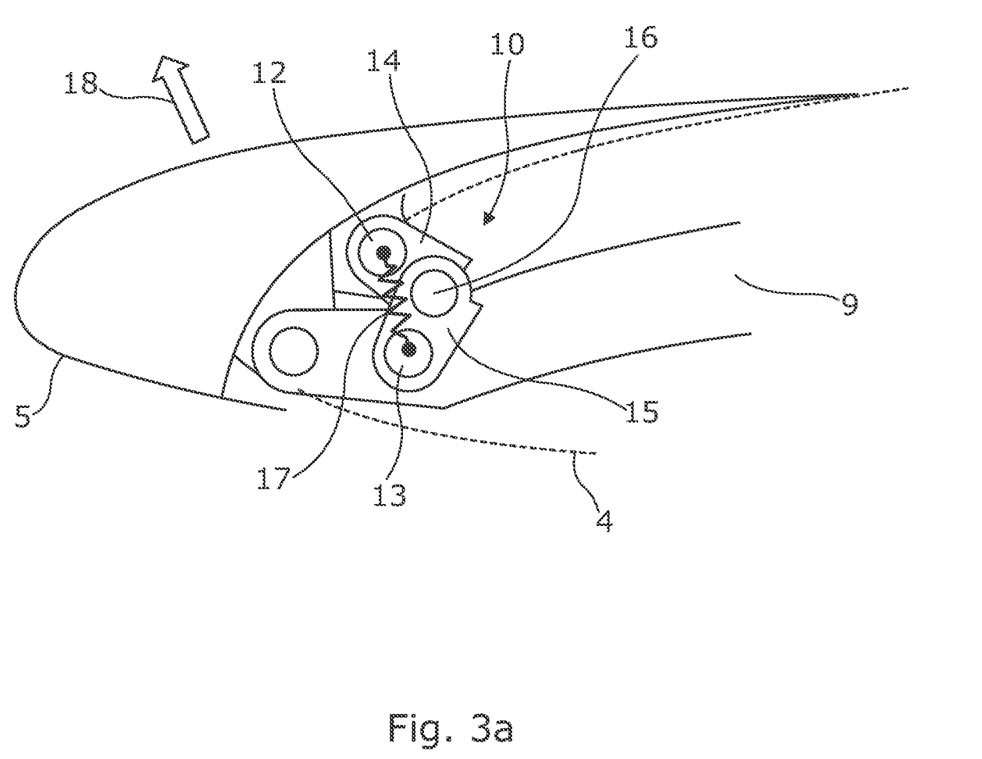
FIG. 3a is a side sectional view of the control mechanism of the present invention in the first position.
Figure 3B:
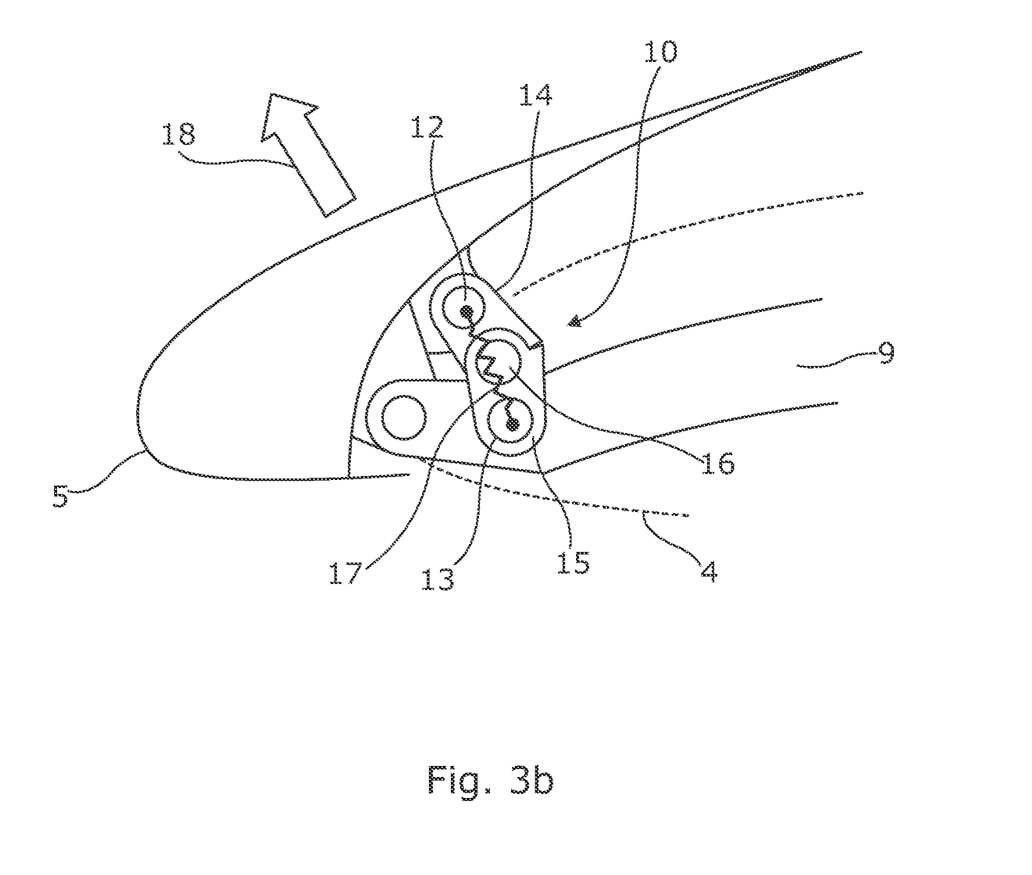
FIG. 3b is a side sectional view of the control mechanism of the present invention in the third position.

The load-alleviation mechanism 10 is shown in more detail in FIGS. 3a and 3b, in the normal flight position and gust-alleviation position respectively. The load-alleviation mechanism 10 is also the means by which the slat 5 is attached to its respective track 9. The mechanism 10 comprises upper and lower bearings 12, 13 respectively; two short arms 14, 15; a ball detent mechanism 16; and a spring 17.

With reference to FIG. 3a, the arms 14, 15 are arranged to be pivotable with respect to each other and with respect to the slat 5 and its track 9. The upper bearing 12 rotatably connects the upper arm 14 to the underside of the slat 5. The lower bearing 13 rotatably connects the lower arm 15 to the track 9. Intermediate the upper and lower arms 14, 15 is a bistable mechanism in the form of a ball detent 16, shown in a first stable position. A spring 17 is also provided between the upper and lower arms 14, 15 and is arranged to urge the arms into the position shown in FIG. 3a, in which the slat lies adjacent the leading edge 7 of the wing 4. In this position, air flows smoothly around the upper and lower surfaces of the slat 5 and wing 4.

If, during flight, a strong gust of wind acts on the wing 4, an upwards force will be generated at the slat 5, as indicated by the arrow 18. If this force 18 is sufficiently strong so as to defeat the holding forces of the spring 17 and ball detent 16, the mechanism 10 will snap into the load-alleviation position of FIG. 3b. In this position, the ball detent 16 occupies a second stable position, the arms 14, 15 are in an extended position and the slat 5 is tilted with respect to the normal retracted position of FIG. 3a. In this load-alleviation position, there is a discontinuity between the upper rear edge of the slat 5 and the upper surface 4a of the wing 4, which spoils the airflow and reduces the lift experienced by the wing.

The spring 17 is arranged to urge the arms 14, 15 and ball detent 16 into the retracted position. If the gust experienced by the aircraft 1 subsequently dies down so that the force 18 it generates at the slat 5 is not sufficient to overcome the restoring force of the spring 17, the mechanism 10 snaps back into the retracted position of FIG. 3a. The forces at which the load-alleviation mechanism 10 activates and de-activates can be selected by careful selection of the components comprising the load-alleviation mechanism 10. For example, the force of the spring and the force needed to overcome the stable positions of the ball detent mechanism can be chosen so that the load-alleviation mechanism usefully moves into and out of a load-alleviation position in accordance with the expected gust forces that would be experienced by the particular aircraft in flight.

The invention provides an automatic alleviation of the loads experienced by a wing during large gusts of wind by utilising an existing aerodynamic device of the aircraft in a new way. Previously, aerodynamic devices such as slats have been employed only in order to increase the lift experienced by the wing during low speed maneuvers. The invention also causes the aerodynamic device to reduce the lift experienced by the wing during cruise flight. By utilising existing components of an aircraft, gust-load alleviation can be effected without adding to the weight of the aircraft.

The invention has been described with reference to controlling the position of at least one slat 5 in flight. However, the invention may alternatively be provided to control one or more flaps 19 located on the trailing edges of the wings 3, 4. Flaps 19 are typically provided in order to raise the lift coefficient of the wings during take-off and landing, in a similar manner to the functioning of the slats 5 as described above with reference to FIGS. 2a and 2b. The load alleviation mechanism of the present invention may be fitted to at least one flap 19 and arranged, in use during turbulence, to cause the flap 19 to occupy a load-alleviation position such that part of it is spaced from to the trailing edge of the wing 3, 4 to which it is attached. In this load-alleviation position, the flap 19 spoils the flow of air over the rear portion of the wing 3, 4 and reduces lift, thereby reducing gust-loading on the wing.

The load-alleviation mechanism may be utilised on all of the slats 5 and/or flaps 19 of an aircraft, or just some of them, in dependence on the size of the wing. For example, a shorter wing will typically experience smaller forces during gust loading and so not all of the slats and/or flaps need be fitted with a load-alleviation mechanism of the present invention.

As previously mentioned, the mechanism may be "tuned" by selecting appropriate springs and other components so that the mechanism switches between the retracted position and load-alleviation position when the force generated by the wind reaches a predetermined threshold. This tuning need not be applied uniformly along all aerodynamic devices: the mechanisms 10 may be tuned in dependence on the position of the respective slat or flap along the edge of the wing. For example, the mechanisms may be tuned so that the slats at the outer ends of the wings occupy the load-alleviation position at a lower gust threshold than the slats closer to the fuselage 2 of the aircraft 1.

Further variations may be made without departing from the scope of the invention. For example, a ball detent mechanism need not be employed: any slip mechanism or bistable linkage may be used.

The load-alleviation mechanisms 10 may be prevented from being activated whilst the respective aerodynamic device is in the deployed position, for example the slat position of FIG. 2b, when extra lift is required. This may be effected by means of a switch arranged to lock the load-alleviation mechanism when the aerodynamic device is in a deployed position. Alternatively, or additionally, the load-alleviation mechanism may be prevented from activating while the aircraft 1 performs low-speed maneuvers, such as during take-off and/or landing. The switch may be activated (by, for example, a control circuit) to lock the load-alleviation mechanism when the aircraft is flying at a speed below a predetermined value, or when the aircraft is taxiing on the runway. Thus, the load-alleviation mechanism is prevented from being accidentally activated when it is not required or when its use would be detrimental to the performance of the aircraft.

Actuators may be provided so that the load-alleviation mechanism may be selectively activated by, for example, the pilot, or by a sensing system arranged to detect gust fronts as they occur. A gust detector 20 may be provided in the nose 21 of the aircraft 1 and its signals may be used to control the position of each load alleviation mechanism 10 of the aerodynamic devices 5, 19 of the aircraft. However, a passive system as described above is preferred as it is able to respond to atmospheric conditions in a near-instantaneous manner.

The invention claimed is:

1. An aircraft control mechanism comprising:
   an aerodynamic device configured to be attached to a wing main body of an aircraft;
   a deployment mechanism selectively operable to move the aerodynamic device between at least one deployed position and a retracted position, and
   a load-alleviation mechanism arranged to move the aerodynamic device into a load-alleviation position in response to a load acting on the aerodynamic device over a predetermined threshold,
   wherein the load-alleviation mechanism, while a first position, is configured to position a trailing or leading edge of the aerodynamic device adjacent an upper surface of the wing main body while the aerodynamic device is in the retracted position,
   wherein the load-alleviation mechanism, while in the load alleviation position, is configured to position the trailing or leading edge of the aerodynamic device apart from and above the upper surface while the aerodynamic device is in the retracted position, and
   wherein the position of the trailing or leading edge of the aerodynamic device above the upper surface while the load-alleviation mechanism is in the load alleviation position spoils airflow over the upper surface of the wing main body.

2. The aircraft control mechanism as claimed in claim 1, in which the aerodynamic device is configured to move into the load-alleviation position only when the aerodynamic device is in the retracted position.

3. The aircraft control mechanism as claimed in claim 1, further comprising a spring arranged to apply a restoring force to bias the load-alleviation mechanism to the first position when the aerodynamic device is in the load-alleviation position.

4. The aircraft control mechanism as claimed in claim 1, in which the aerodynamic device is connected to the deployment mechanism by the load-alleviation mechanism.

5. The aircraft control mechanism as claimed in claim 1, in which the deployment mechanism comprises at least one track and a selectively operable actuator arranged to move the aerodynamic device along the track between the deployed and retracted positions.

6. The aircraft control mechanism as claimed in claim 1, in which the load-alleviation mechanism includes a bistable mechanism, wherein the bistable mechanism has a first stable position corresponding to the first position of the load-alleviation mechanism, and a second stable position corresponding to the load alleviation position of the load-alleviation mechanism, and the bistable mechanism is biased to the first stable position.

7. The aircraft control mechanism as claimed in claim 6, in which the bistable mechanism includes a ball detent device.

8. An aircraft wing comprising the wing main body and the aircraft control mechanism as claimed in claim 1.

9. The aircraft wing as claimed in claim 8, in which the wing main body comprises a leading edge and the aerodynamic device comprises a slat adjacent the leading edge.

10. The aircraft wing as claimed in claim 8, in which the wing main body comprises a trailing edge and the aerodynamic device comprises a flap adjacent the trailing edge.

11. The aircraft wing as claimed in claim 8, in which the aircraft control mechanism comprises at least one actuator arranged to move the aerodynamic device into and out of the load alleviation position.

12. The aircraft wing as claimed in claim 8, wherein the wing main body include a leading edge and a trailing edge, and the aircraft control mechanism is a plurality of aircraft control mechanisms each of which includes a respective one of the aerodynamic device comprising a slat adjacent the leading edge or a flap adjacent the trailing edge.

13. The aircraft wing as claimed in claim 12, in which the respective aircraft control mechanisms are arranged such that each aerodynamic device moves into its load-alleviation position at respective predetermined load thresholds.

14. An aircraft including the aircraft control mechanism as claimed in claim 1.

15. An aircraft including the wing claimed in claim 8.

16. An aircraft including the wing claimed in claim 11, and further comprising a gust detector, and the actuator is arranged to move the aerodynamic device in response to signals from the gust detector.

17. An aircraft wing comprising:
a wing main body including a wing main body leading edge and a wing main body upper surface extending aft of the leading edge in a chordwise direction of the wing main body;
a track mounted to the wing main body and extending forward of the wing main body leading edge;
a slat mounted to the track and including a slat leading edge, a slat upper surface extending aft of the slat leading edge in the chordwise direction and a slat trailing edge at an aft portion of the slat upper surface, wherein the slat is configured to move by or along the track between a retracted position in which the slat is adjacent to and overlaps the wing main body leading edge and a portion of the wing main body upper surface; and a deployed position in which the slat protrudes forward of the wing main body leading edge in the chordwise direction such that a gap is formed between the slat and the wing main body leading edge and the wing main body upper surface; and
an extendable linkage mounted to the track and to the slat, wherein the extendable linkage is configured to pivot about the track to move the slat from the retracted position to a load-alleviation position by moving the trailing edge of the slat above and away of the wing main body upper surface while the slat leading edge remains adjacent the wing main body leading edge,
wherein airflow over the wing main body is spoiled by the trailing edge of the slat being above and away from the wing main body while the slat is in the load-alleviation position.

18. An aircraft wing comprising:
a wing main body including a wing main body leading edge and a wing main body upper surface extending aft of the leading edge in a chordwise direction of the wing main body;
a track mounted to the wing main body and extending forward of the wing main body leading edge;
a slat mounted to the track and including a slat leading edge, a slat upper surface extending aft of the slat leading edge in the chordwise direction and a slat trailing edge at an aft portion of the slat upper surface, wherein the slat is configured to move by or along the track between a retracted position in which the slat is adjacent to and overlaps the wing main body leading edge and a portion of the wing main body upper surface; and a deployed position in which the slat protrudes forward of the wing main body leading edge in the chordwise direction such that a gap is formed between the slat and the wing main body leading edge and the wing main body upper surface;
an extendable linkage mounted to the track and to the slat, wherein the extendable linkage is configured to pivot the slat from the retracted position to a load-alleviation position by moving the trailing edge of the slat above and away of the wing main body upper surface while the slat leading edge remains adjacent the wing main body leading edge, and
a spring mounted to the extendable linkage and biasing the extendable linkage in a retracted position which positions the slat trailing edge in the retracted position, wherein the extendable linkage is configured to move the slat to the load-alleviation position in response to an aerodynamic lift force applied to the slat which overcomes a biasing force of the spring.

19. The aircraft wing of claim 18, further comprising a first pivot joint between the slat and the track,
wherein the extendable linkage includes a lower arm pivotably attached to the track, an upper arm pivotably attached to the slat at a second pivot joint aft of the first pivot joint, and a third joint connecting the lower arm to the upper arm;
wherein the spring is attached to the upper and lower arm to bias the upper and lower arm together, and
wherein the slat pivots about the first pivot joint as the extendable linkage extends.

* * * * *